(12) United States Patent
Bannon et al.

(10) Patent No.: US 10,006,476 B2
(45) Date of Patent: Jun. 26, 2018

(54) MISTAKE PROOF RAM AIR TURBINE DOWNLOCK PROTECTION

(71) Applicant: Hamilton Sundstrand Corporation, Charlotte, NC (US)

(72) Inventors: David G. Bannon, Rockford, IL (US); Paul Michael Reinhard, Marengo, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 453 days.

(21) Appl. No.: 14/719,817

(22) Filed: May 22, 2015

(65) Prior Publication Data

US 2016/0341225 A1    Nov. 24, 2016

(51) Int. Cl.
| F15B 15/20 | (2006.01) |
| F15B 15/14 | (2006.01) |
| B64D 41/00 | (2006.01) |
| F01D 5/02 | (2006.01) |
| F01D 25/28 | (2006.01) |

(52) U.S. Cl.
CPC .......... *F15B 15/149* (2013.01); *B64D 41/007* (2013.01); *F01D 5/02* (2013.01); *F01D 25/28* (2013.01); *F15B 15/1476* (2013.01); *F15B 15/204* (2013.01); *F05D 2220/34* (2013.01); *F05D 2240/24* (2013.01); *F05D 2260/57* (2013.01)

(58) Field of Classification Search
CPC ........ F01D 5/02; F01D 25/28; F15B 15/1476; F15B 15/204; F15B 15/221; F15B 2211/851; F15B 15/26; F15B 15/24; F15B 15/202; F15B 15/22; B64D 41/007
See application file for complete search history.

(56) References Cited

U.S. PATENT DOCUMENTS

| 5,820,074 A * | 10/1998 | Trommer ............. B64D 41/007 244/58 |
| 8,246,302 B2 | 8/2012 | Bertolotti |
| 2013/0078026 A1 | 3/2013 | Sasscer et al. |

(Continued)

FOREIGN PATENT DOCUMENTS

| CN | 104033449 A | 9/2014 |
| EP | 1031697 A1 * | 8/2000 ............ F15B 15/224 |

(Continued)

OTHER PUBLICATIONS

Extended European Search Report for EP Application No. 16170480.4, dated Oct. 4, 2016, 10 pages.

*Primary Examiner* — F. Daniel Lopez
*Assistant Examiner* — Abiy Teka
(74) *Attorney, Agent, or Firm* — Kinney & Lange, P.A.

(57) ABSTRACT

An actuator assembly includes a housing, an internal cavity within the housing configured to partially contain a pressurized fluid, a fluid inlet port connecting a first opening on an outer surface of the housing to the internal cavity, a fluid outlet port connecting a second opening on the outer surface of the housing to the internal cavity, and a pressure relief channel having a relief inlet and a relief outlet. The relief outlet is in fluid communication with the internal cavity and a distance between the fluid inlet port and the relief outlet is less than half a distance between the fluid inlet port and fluid outlet port.

20 Claims, 3 Drawing Sheets

(56) References Cited

U.S. PATENT DOCUMENTS

2015/0096437 A1* 4/2015 Russ .................... B64D 41/007
                                                    92/63
2015/0167702 A1* 6/2015 Ozanich ............... F15B 15/261
                                                    92/27

FOREIGN PATENT DOCUMENTS

NL        1020960 C2    12/2003
WO      WO87/02642 A1   5/1987

* cited by examiner

MISTAKE PROOF RAM AIR TURBINE DOWNLOCK PROTECTION

BACKGROUND

The present invention relates to a ram air turbine and more specifically to a stowing assembly for a ram air turbine.

Ram air turbines (RATs) are small turbines installed on aircrafts to provide emergency power. Generally, the RAT can be stowed inside of the fuselage or wing of an aircraft and manually or automatically deployed into an airstream outside of the aircraft during a power outage. The RAT rotates in the airstream to generate hydraulic and/or electric power for the aircraft. To prevent movement of the RAT following deployment, a spring loaded downlock pin can be used to secure the RAT in the deployed position. The downlock pin can help prevent rotation of a RAT deployment strut and prevent collision of the RAT with the aircraft while the RAT is operating. Once the aircraft has landed, the RAT can be restowed by manually retracting the downlock pin and operating a hydraulic actuator assembly to retract the RAT into a stowed position. If an operator fails to disengage the downlock pin prior to operating the actuator assembly, the actuator assembly will exert a force against the downlock pin, which can damage the downlock pin, strut, and/or aircraft structure.

A need exists for a stowage assembly that prevents damage to the downlock pin, strut, aircraft, and other components in the event that the operator fails to retract the downlock pin before operating the actuator assembly, while also allowing normal restowage of the RAT if the downlock pin has been retracted. Such stowage assembly should not significantly increase the space or weight of the current technology, or require complicated linkages and hardware or changes to the existing configuration of other system components.

SUMMARY

An actuator assembly includes a housing, an internal cavity within the housing configured to partially contain a pressurized fluid, a fluid inlet port connecting a first opening on an outer surface of the housing to the internal cavity, a fluid outlet port connecting a second opening on the outer surface of the housing to the internal cavity, and a pressure relief channel having a relief inlet and a relief outlet. The relief outlet is in fluid communication with the internal cavity. A distance between the fluid inlet port and the relief outlet is less than half a distance between the fluid inlet port and fluid outlet port.

An actuator assembly for a ram air turbine including a housing, a piston, a first and second internal cavity within the housing configured to partially contain a pressurized fluid on a first and a second side of the piston, and a pressure relief valve with a relief inlet and a relief outlet. The relief inlet is in fluid communication with the first cavity and the relief outlet is in fluid communication with the second cavity when the piston is positioned between the relief inlet and the relief outlet. Each of the pressure relief valve, relief inlet, and relief outlet are located within the housing.

A method of operating an actuator assembly for stowing a ram air turbine includes the steps of pumping hydraulic fluid into an inlet of a first cavity of a hydraulic cylinder to retract an actuator rod from a fully deployed position and redirecting fluid from the first cavity to a second cavity opposite a piston seal to relieve pressure in the first cavity when a pressure differential across the piston seal reaches a threshold value. The step of redirecting fluid includes channeling fluid from the inlet through a housing of the actuator assembly.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
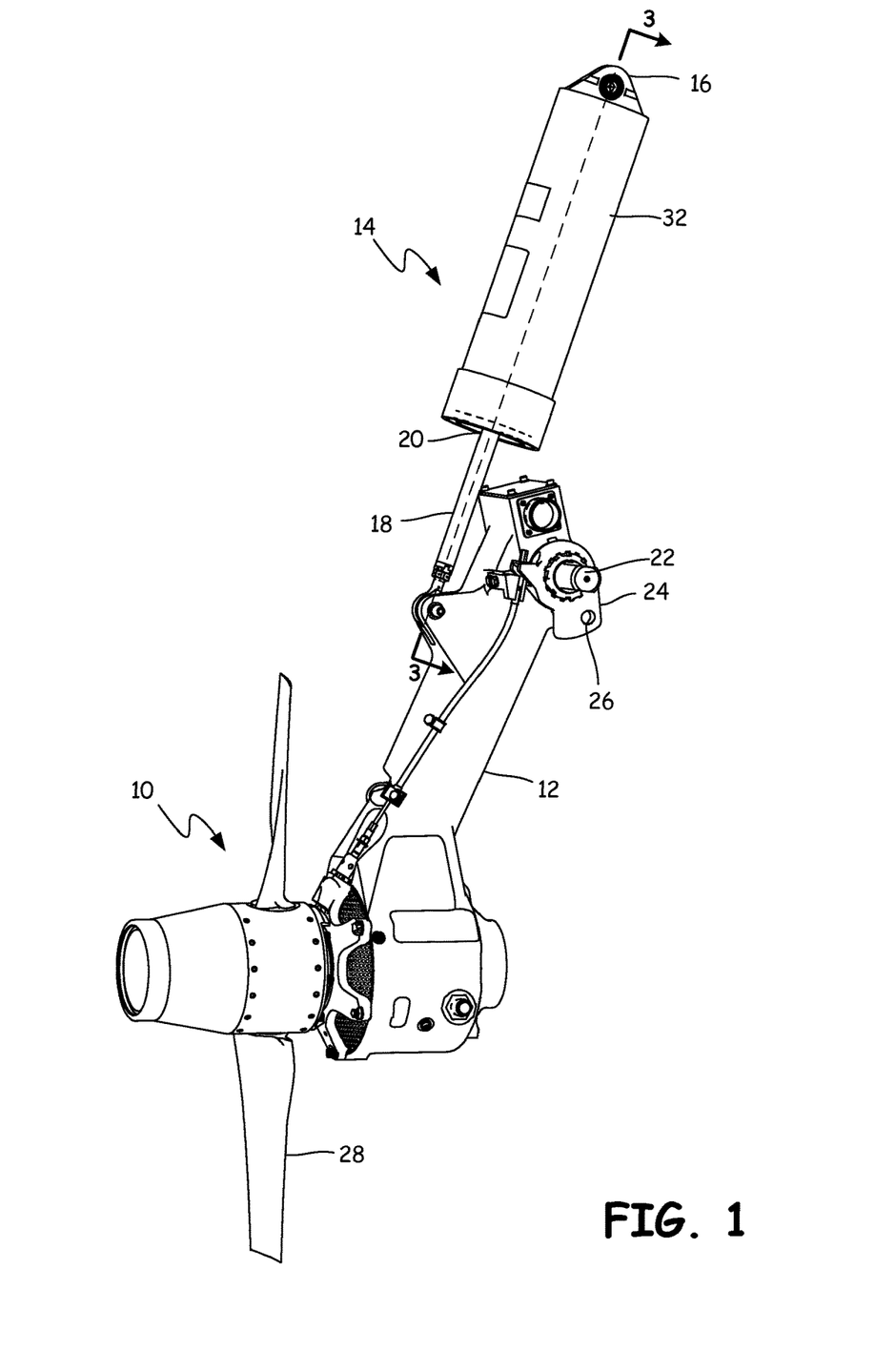
FIG. 1 is a perspective view of a ram air turbine in a deployed position with an actuator assembly.

FIG. 1 is a perspective view of a ram air turbine (RAT) 10 in a deployed position. The RAT 10 extends from a strut 12 which can be lowered and raised by a hydraulic actuator assembly 14 for deploying and restowing the RAT 10, respectively. The actuator assembly 14 is fixed to an aircraft (not shown) at a first end 16. An actuator rod 18 extends from a second end 20 and connects to the strut 12 of the RAT 10. The strut 12 is rotatably fixed to the aircraft by a pivot post 22, and can be locked in position through a collar 24, which is fixed to the pivot post 22. When the RAT 10 is deployed, the actuator rod 18 extends from the actuator assembly 14, causing the strut 12 to rotate about the pivot post 22. In one embodiment, the strut 12 rotates in a counter-clockwise direction (as shown in FIG. 1) to lower the RAT 10 into an airstream outside of the aircraft. When the RAT 10 reaches the position of full deployment, a spring-loaded downlock pin 26 attached to the strut 12 engages the collar 24 to lock the strut 12, and thereby RAT 10 in the deployed position. In this manner, rotating blades 28 of the RAT 10 can be securely positioned away from the aircraft and in the airstream. In another embodiment, the downlock pin 26 can be located on the collar 24 and configured to engage a portion of the strut 12 when the strut 12 reaches the fully deployed position. Once the aircraft has landed, the downlock pin 26 can be manually retracted to allow restowage of the RAT 10.

In restowage, a hydraulic pump assembly 30 can be used to retract the actuator rod 18, forcing the strut 12 to rotate (e.g., in a clockwise direction) about the pivot post 22 thereby raising the RAT 10 back into the aircraft. If the operator fails to remove the downlock pin 26, resistance (i.e., mechanical interference) created by the downlock pin 26 will prevent the actuator rod 18 from being retracted. The actuator assembly 14 can help prevent damage to the downlock pin 26 and components that interact with the downlock pin 26 in the event that the downlock pin 26 remains engaged when restowing operations commence. Although the embodiment disclosed uses a spring-loaded downlock pin 26 to lock the RAT 10 in the deployed position, it will be understood by one skilled in the art that other locking mechanisms may be utilized and the scope of the invention is not limited by the locking mechanism disclosed.

Figure 2A:
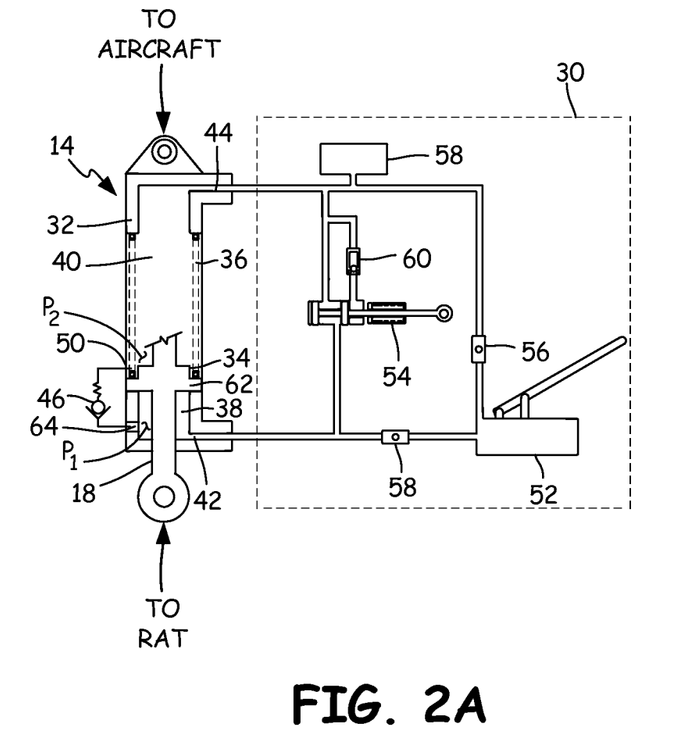
FIG. 2A is a schematic view of the actuator assembly during attempted restowage of the ram air turbine when the ram air turbine is locked in a deployed position.
Figure 2B:
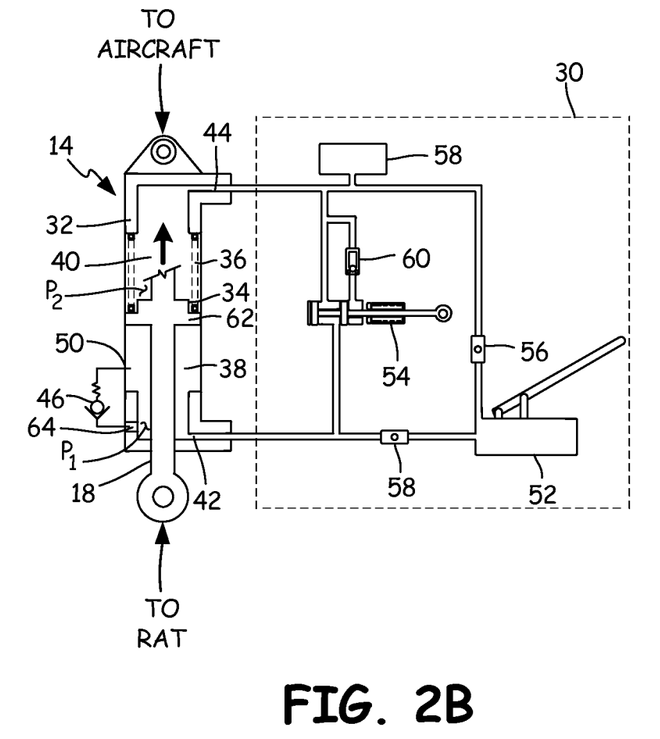
FIG. 2B is a schematic view of the actuator assembly when the ram air turbine is being moved into a stowed position.
Figure 3:
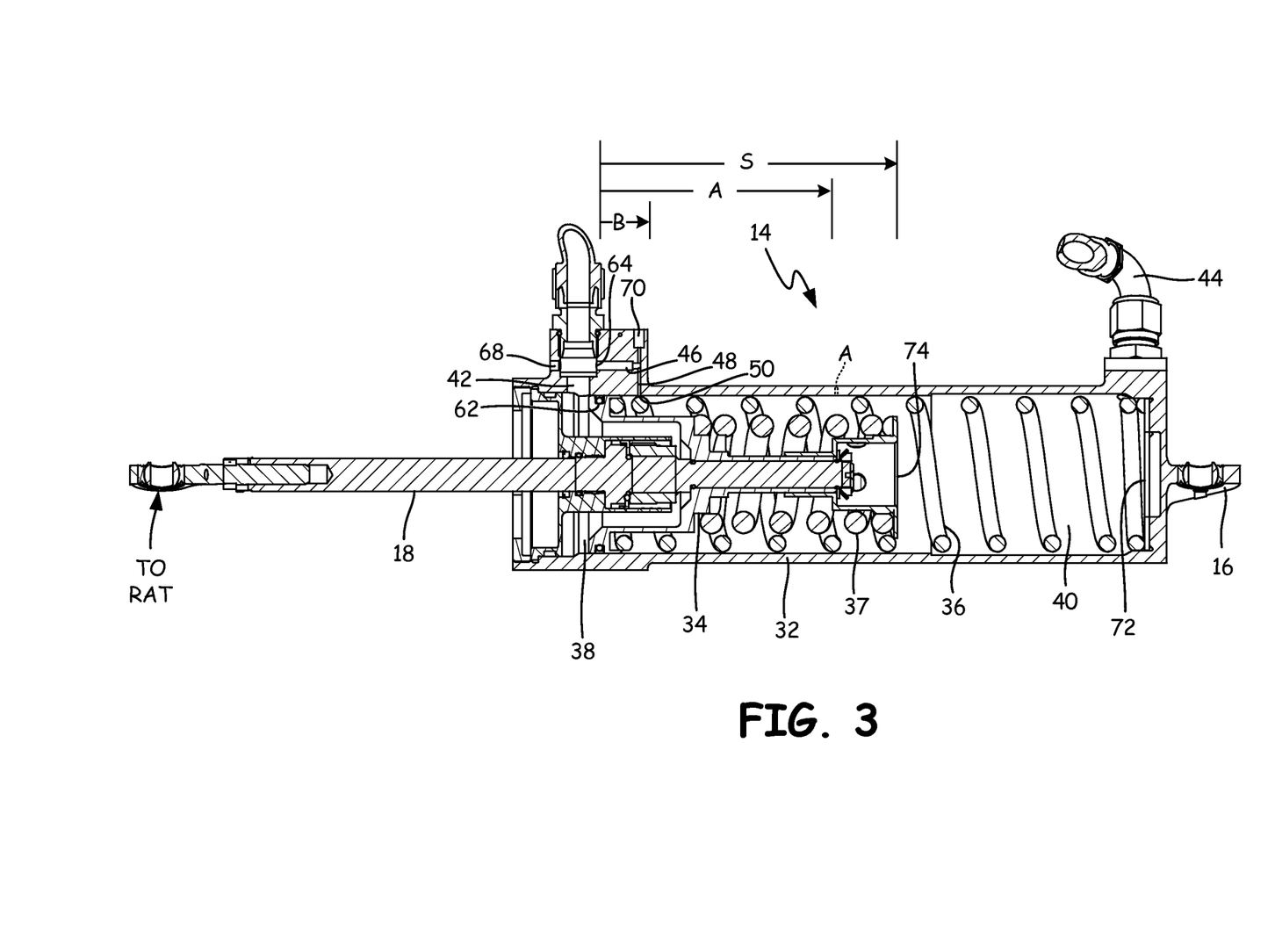
FIG. 3 is a cross-sectional view of the actuator assembly taken along the 3-3 line of FIG. 1.

FIGS. 2A and 2B are schematic views of the actuator assembly 14 and a pump assembly 30 during two different conditions. FIG. 2A illustrates attempted restowage of the RAT 10 when the downlock pin 26 is engaged. FIG. 2B illustrates successful restowage of the RAT 10 when the downlock pin 26 has been disengaged. FIG. 3 is a cross-sectional view of the actuator assembly 14 taken along the 3-3 line of FIG. 1. The actuator assembly 14 can be a double-acting hydraulic cylinder, including a housing 32, a piston 34, one or more springs 36, 37 acting on the piston 34, an actuator rod 18 connected to the piston 34, and first and second cavities 38, 40 for holding hydraulic fluid. The housing 32 can include a fluid inlet port 42, a fluid outlet port 44, a low-pressure relief valve 46, and a relief channel 48 with a relief outlet 50 into the first or second cavity 38, 40, depending on the position of the piston 34. The actuator assembly 14 can be operated by a hydraulic pump assembly 30 known in the art. FIGS. 2A and 2B show a hand pump 52 for operating the assembly 30, although it will be understood by one skilled in the art that other suitable automatic or manual pumping mechanisms can be used in alternate embodiments. The hydraulic pump assembly 30 can include a valve 54, such as a spool valve, to control the direction of hydraulic fluid flow for deployment and stowage of the RAT 10, a plurality of check valves 56, and a reservoir 58. A relief valve 60 can be used to limit the maximum force the actuator 14 can apply to the RAT 10 while still allowing for restowage. For instance, in one embodiment, a pressure differential of 500 psid (3.45 Mpa) can be sufficient force the piston 34 to complete a stroke for restowage of the RAT 10, and thus a 500 psid relief valve 60 can be used to prevent overpressurization of the actuator assembly 14. The amount of pressure required to restow the RAT 10 is sufficient to cause damage to the downlock pin 26 and components with which the downlock pin 26 is engaged when the downlock pin 26 remains engaged during attempted restowage. Therefore, while the relief valve 60 can help prevent additional damage to the actuator assembly 14 due to overpressurization, it is not intended to prevent damage to the downlock pin 26 and components with which the downlock pin 26 is engaged in the event the downlock pin 26 has not been retracted.

When the RAT 10 is in the deployed position, the actuator rod 18 is fully extended from a bottom of the housing 32. To restow the RAT 10, hydraulic fluid is pumped into the actuator assembly 14 through the fluid inlet port 42 of the housing 32. The hydraulic fluid enters a first cavity 38 on the inlet 42 side of the piston 34. The hydraulic fluid acts on the piston 34 forcing the piston 34 to move in a manner that retracts the actuator rod 18. The pressure in the first cavity 38 must be great enough to overcome the force of the springs 36, 37 (shown in FIG. 3) acting against the piston 34 on the outlet 44 side of the piston 34. The hydraulic fluid in the second cavity 40 is forced out of the housing 32 through the fluid outlet port 44.

The low-pressure relief valve 46 can be used to limit or prevent the movement of the piston 34 in the event the operator has failed to retract the downlock pin 26 prior to operating the hydraulic pump assembly 30. Limiting or preventing movement of the piston 34 reduces a force applied by the actuator assembly 14 against the downlock pin 26 and prevents damage to the downlock pin 26. The low-pressure relief valve 46 can be positioned to extend across a piston seal 62 when the actuator rod 18 is in the fully extended (deployed) position, such that an inlet 64 of the low-pressure relief valve 46 is in direct fluid communication with the fluid inlet port 42 or the first cavity 38 and the relief outlet 50 is in direct fluid communication with the second cavity 40 on the outlet 44 side of the piston seal 62. The piston seal 62 limits or prevents hydraulic fluid from flowing across the piston 34 and thereby allows pressure to build up on one side of the piston 34. The low-pressure relief valve 46 serves to relieve pressure in the first cavity 38 when the downlock pin 26 remains engaged, thereby limiting or preventing movement of the piston 34 and RAT 10 against the downlock pin 26.

The low-pressure relief valve 46 can be a conventional forward flow relief valve with an integral screen to prevent foreign object damage and/or jamming of the mechanism. The low-pressure relief valve 46 can be activated by a specific pressure differential across the piston seal 62 (pressures on either side of the seal are denoted by $P_1$ and $P_2$). The position of the piston seal 62 can correspond to a position where the strut 12 of the RAT 10 encounters resistance from the downlock pin 26. In the event that the operator fails to retract the downlock pin 26 before operating the hydraulic pump (FIG. 2A), pressure ($P_1$) will build on the fluid inlet port 42 side of the piston seal 62 (first cavity 38), creating a pressure differential ($P_1$:$P_2$) across the piston seal 62 that triggers the low-pressure relief valve 46 to redirect hydraulic fluid to the second cavity 40. The low-pressure relief valve 46 can be passively pressure-activated by a pressure differential at which the downlock pin 26 and components with which the downlock pin 26 interacts will not be damaged. In one embodiment, the maximum pressure ($P_1$) that can be applied to the inlet 42 side of the piston 34 without damaging the downlock pin 26 and other components can be 310 psig for an actuator housing 32 with an inner diameter of 3.5 inches. To prevent the pressure ($P_1$) from reaching the maximum allowable pressure, a low-pressure relief valve 46 with a cracking pressure (pressure at which the low-pressure relief valve 46 opens) of 100 psid (689 kPa) can be used. It will be understood by one skilled in the art that the maximum pressure ($P_1$) that can be applied to the inlet 42 side of the piston 34 without causing damage can vary in accordance with the inner diameter of the housing and that low-pressure relief valves with varying cracking pressures can be used to accommodate varying system loads or other applications. Additionally, it will be understood by one skilled in the art that the low-pressure relief valve 46 can be chosen based in part on design optimization of the housing 32. For example, a low-pressure relief valve 46 with a cracking pressure greater than 100 psid may require adding material to the housing 32 to accommodate a larger relief valve diameter and passage length.

As the operator continues to operate the hydraulic pump 52, additional hydraulic fluid will be redirected across the piston seal 62 to prevent the piston 34 from moving and thereby preventing retraction of the actuator rod 18 and RAT 10, as shown in FIG. 2A. The operator will notice that the RAT 10 remains deployed despite operation of the pump 52, and can retract the downlock pin 26. Activation of the low-pressure relief valve 46 could additionally trigger a suitable alarm or indication in further embodiments, alerting an operator to remove the downlock pin 26.

When the downlock pin 26 has been disengaged (FIG. 2B), hydraulic fluid can be pumped through the fluid inlet port 42 to act on the piston 34 and cause the piston 34 to complete the stroke. Hydraulic fluid pumped into the first cavity 38 remains within the first cavity 38 and pressure ($P_1$) begins to build, forcing the piston 34 to move. The relief outlet 50 can be positioned at a location along an axial path of the piston 34 before which a pressure differential ($P_1$:$P_2$) is created to open the low-pressure relief valve 46. In other words, the relief outlet 50 can be positioned such that the piston seal 62 can pass the relief outlet 50 before the low-pressure relief valve 46 has been activated by an increasing pressure ($P_1$) in the first cavity 38. Once the piston seal 62 has moved past the relief outlet 50, the relief outlet 50 is in direct fluid communication with the first cavity 38, in which the relief inlet 64 is positioned. Because a pressure ($P_1$) at the relief outlet 50 equals a pressure ($P_1$) at the relief inlet 64, the low-pressure valve 46 is inactive. As hydraulic fluid is pumped, pressure ($P_1$) can further increase in the first cavity 38, at this point, limited only by the relief valve 60 in the pump assembly 30. The actuator rod 18 and RAT 10 can be forced to retract fully into the stowed position, as shown in FIG. 2B.

In the embodiment shown in FIG. 3, the low-pressure relief valve 46 is located within the housing 32 of the actuator assembly 14. The housing 32 can be machined to create a space for the low-pressure relief valve 46 and the relief outlet channel 48. One channel can be machined through a cross-section of the fluid inlet port 42 to create a space for the low-pressure relief valve 46 adjacent and perpendicular to the fluid inlet port 42. The fluid relief channel 48 can be machined substantially parallel to the fluid inlet port 42, extending through the housing 32 and abutting the low-pressure relief valve 46. Two plugs 68, 70 can be inserted into the housing 32 to prevent fluid from escaping the housing 32 through the machined channels. The plugs 68, 70 can be made of the same material as the housing, including but not limited to aluminum, or can be made of other suitable material known in the art. Placing the low-pressure relief valve 46 within the housing 32 of the actuator assembly 14 requires adding only a small amount of material to the housing 32 and does not require changing the configuration of any other existing components in the actuator and pumping assemblies. In another embodiment, the low-pressure relief valve 46 can be positioned outside of the housing 32 with the relief inlet 64 in direct fluid communication with the fluid inlet port 42 or the cavity of the housing 32 in which the fluid inlet port 42 is in direct fluid communication. The relief outlet 50 can be substantially the same, extending from the outlet of the low-pressure relief valve 46 through the housing 32 into the cavity. The plugs 68, 70 are unnecessary in this configuration.

Two springs 36, 37 can be used to exert a force on the piston 34 on the fluid outlet 44 side of the piston 34 to assist in deployment of the actuator rod 18. The outer spring 36 can extend from a portion of the piston 34 along the housing 32 to and inner end 72 of the housing 32 adjacent the fluid outlet port 44. The inner spring can extend from a portion of the piston 34 inward of the outer spring 36 to a spring carrier 74, which can be movably connected to the actuator rod 18. The pressure $P_1$ on the inlet 42 side of the piston 34 must be sufficient to overcome the force of both the outer and inner springs 36, 37 for complete restowage of the RAT 10.

As previously discussed, the relief outlet 50 can be located in relation to the position of the piston seal 62 (or fluid inlet port 42, which is in close proximity of the piston seal 62) when the actuator rod 18 is fully extended, and the cracking pressure and dimensions of the low-pressure relief valve 46. In order for the actuator assembly 14 to restow the RAT 10, the low-pressure relief valve 46 must not be triggered if the downlock pin 26 has been retracted. To ensure that the low-pressure relief valve 46 is not activated, the relief outlet 50 can be positioned at a location along an axial path of the piston 34 before which the requisite pressure can be reached to open the low-pressure relief valve 46. In one embodiment, the low-pressure relief valve 46 can be triggered when the spring carrier 74 on the piston 34 engages the housing 32 at the inner end 72 and the inner spring 37 begins to compress as the piston 34 moves the actuator rod 18 into the fully stowed position. In this embodiment, the pressure ($P_1$) required to overcome the outer spring 36 can be significantly lower than the pressure ($P_1$) required to overcome the inner spring 37, such that the low-pressure relief valve 46 is not activated over the portion of the stoke causing compression of the outer spring 36 only (provided the downlock pin 26 is disengaged). The inner spring 37 does not begin to compress until the spring carrier 74 on the piston 34 engages the inner end 72 of the housing 32. The amount of pressure ($P_1$) required to overcome the inner spring 37 can be sufficient to trigger the low-pressure relief valve 46, thus the piston seal 62 must cross the relief outlet 50 before the spring carrier 74 engages the inner end 72 of the housing 32. To allow for complete restowage of the RAT 10, the relief outlet can be located at a position (A) along the axial path of the piston 34, which corresponds to a location of the piston seal 62 before which the spring carrier 74 engages the inner end 72 of the housing 32. In the embodiment shown in FIG. 3, the position (A) corresponds to approximately 80 percent of a piston stroke (S) and is approximately five inches from the fluid inlet port 42, which is less than half a distance between the fluid inlet port 42 and the fluid outlet port 44, where the distance between the fluid inlet port 42 and the fluid outlet port 44 is approximately 12 inches. To limit the amount of additional material added to the housing 32 to contain the low-pressure relief valve 46 and the relief channel 48, the relief outlet 50 can be positioned significantly closer to the fluid inlet port 42.

In the embodiment shown in FIG. 3, the relief outlet 50 is located at a position (B) approximately one inch from the fluid inlet port 42 (approximately 0.9 inches from the piston seal 62 when the actuator rod 18 is fully deployed), which corresponds to approximately 17 percent of the piston stroke (S). In this embodiment, the distance between the relief outlet 50 and the fluid inlet port 42 can substantially match the passage length of the low-pressure relief valve 46, thereby limiting the amount of additional material required to contain the low-pressure relief valve 46 and the relief channel 48 in the housing 32. In general, the position of the relief outlet 50 will correspond to a location at approximately 15-20 percent of the piston stroke (S) when the 100 psid low-pressure relief valve 46 is positioned in the housing 32 as disclosed in FIG. 3. Although the disclosed embodiments include a range for locating the relief outlet 50, including a distance of approximately one to five inches from the fluid inlet port 42 a location corresponding to approximately 15-80 percent of the piston stoke, it will be understood by one skilled in the art that the distance between the relief outlet 50 and the fluid inlet port 42 can be varied in accordance with varying system loads and low-pressure relief valve 46 dimensions and cracking pressure. In general, the relief outlet 50 can be positioned as close to the piston seal 62 as possible to allow fluid flow through the relief outlet 50 into the second cavity 40.

A circumferential edge of the relief outlet 50 at the location of the cavity 38, 40 can be smoothed to prevent damage to the piston seal 62. The piston seal 62 prevents fluid from flowing across the piston 34 by forming a tight seal with an inner surface of the housing 32. The circumferential edge of the relief outlet 50 can be smoothed to prevent the edge from cutting into, scraping, or otherwise damaging the piston seal 62 as the piston seal 62 is forced past the relief outlet 50 during restowage of the RAT 10. A chamfered or rounded edge can be sufficient to prevent damage to the piston seal 62.

The present invention helps prevent damage to the downlock pin 26 and components with which the downlock pin 26 interacts in the event that an operator fails to retract the downlock pin before operating the hydraulic pump and actuator assemblies 30, 14. The low-pressure relief valve 46 and relief outlet 50 designed to prevent such damage can be incorporated into the housing 32 of the actuator assembly 14 without adding significant amounts of material to the housing 32 and without requiring complicated linkages and hardware or changes to the existing configuration of other system components. Smoothing the circumferential edge of the relief outlet 50 can prevent damage to the piston seal 62, thereby extending the lifetime of the piston seal 62 and ensuring proper operation of the actuator assembly 14.

Discussion of Possible Embodiments

The following are non-exclusive descriptions of possible embodiments of the present invention.

An actuator assembly includes a housing, an internal cavity within the housing configured to partially contain a pressurized fluid, a fluid inlet port connecting a first opening on an outer surface of the housing to the internal cavity, a fluid outlet port connecting a second opening on the outer surface of the housing to the internal cavity, and a pressure relief channel having a relief inlet and a relief outlet. The relief outlet is in fluid communication with the internal cavity and a distance between the fluid inlet port and the relief outlet is less than half a distance between the fluid inlet port and fluid outlet port.

The actuator assembly of the preceding paragraph can optionally include, additionally and/or alternatively, any one or more of the following features, configurations and/or additional components:

The actuator assembly of the preceding paragraph, further including a pressure relief valve positioned between the relief inlet and the relief outlet, wherein the relief inlet is in fluid communication with the fluid inlet port.

The actuator assembly of the preceding paragraph, wherein the pressure relief valve is located within the housing.

The actuator assembly of the preceding paragraph, wherein the pressure relief valve is positioned perpendicular to both the fluid inlet and the relief channel and wherein the distance between the relief outlet and the fluid inlet port approximately matches a length of the pressure relief valve.

The actuator assembly of the preceding paragraph, wherein the pressure relief valve is configured to open when a pressure differential across the relief inlet and relief outlet reaches a threshold value not exceeding 100 psid (689 kPa).

The actuator assembly of the preceding paragraph, wherein the pressure relief channel extends fully through the housing and wherein a plug is positioned in the pressure relief channel at the outer surface of the housing.

The actuator assembly of the preceding paragraph, further including a piston with a first and second end, an actuator rod connected to the piston and extending beyond both the first and second end, a first and second spring, and a spring carrier located at an end of the actuator rod. The first spring extends from the first end of the piston to an end of the housing adjacent the fluid outlet port and the second spring extends from the second end of the piston to the spring carrier.

The actuator assembly of the preceding paragraph, further including a ram air turbine, a strut connecting the ram air turbine to the actuator rod, a pivot post about which the strut is configured to rotate, a collar fixed to the pivot post, and a downlock pin. The pivot post is fixed to a mounting location. The downlock pin engages the collar to limit rotational movement of the strut when the ram air turbine is in a deployed position. The location of the relief outlet corresponds to a position of the strut wherein the strut has rotated past a point where the downlock pin, if engaged, would prevent movement.

The actuator assembly of the preceding paragraph, wherein the piston further includes a seal wherein the seal is positioned along a perimeter of the internal cavity between the fluid inlet port and the relief outlet when the actuator rod is in a fully deployed position and is positioned between the relief outlet and the fluid outlet port when the actuator rod is in a fully retracted position.

The actuator assembly of the preceding paragraph, wherein the seal is positioned along the perimeter of the internal cavity between the relief outlet and the fluid outlet port when the spring carrier contacts the end of the housing adjacent the fluid outlet port.

The actuator assembly of the preceding paragraph, wherein the location of the relief outlet corresponds to a position less than or equal to 20 percent of the piston stroke.

The actuator assembly of the preceding paragraph, wherein the relief outlet has a smooth circumferential edge.

An actuator assembly for a ram air turbine including a housing, a piston, a first and second internal cavity within the housing configured to partially contain a pressurized fluid on a first and a second side of the piston, and a pressure relief valve with a relief inlet and a relief outlet. The relief inlet is in fluid communication with the first cavity and the relief outlet is in fluid communication with the second cavity when the piston is positioned between the relief inlet and the relief outlet. Each of the pressure relief valve, relief inlet, and relief outlet are located within the housing.

The actuator assembly of the preceding paragraph, wherein the pressure relief valve is activated by a pressure differential between the first and second cavity equal to or less than 100 psid (689 kPa).

The actuator assembly of the preceding paragraph, wherein the location of the relief outlet corresponds to a position less than 80 percent of the piston stroke.

The actuator assembly of the preceding paragraph, wherein the location of the relief outlet corresponds to a position less than or equal to 20 percent of the piston stroke.

The actuator assembly of the preceding paragraph, further including an actuator rod, a strut connected to the actuator rod, a pivot post about which the strut is configured to rotate, a collar fixed to the pivot post, and a downlock pin. The pivot post is fixed to a portion of an aircraft. The downlock pin engages the collar to limit rotational movement of the strut when the actuator rod is in a deployed position. The location of the relief outlet corresponds to a position of the strut wherein the strut has rotated past a point where the downlock pin, if engaged, would prevent movement.

The actuator assembly of the preceding paragraph, further including a fluid inlet in fluid communication with the first cavity and the relief inlet of the pressure relief valve. The pressure relief valve is positioned substantially perpendicular to the fluid inlet and a distance between the relief outlet and the fluid inlet approximately matches a length of the pressure relief valve.

A method of operating an actuator assembly for stowing a ram air turbine includes the steps of: pumping hydraulic fluid into an inlet in a first cavity of a hydraulic cylinder to retract an actuator rod from a fully deployed position, and redirecting fluid from the first cavity to a second cavity opposite a piston seal to relieve pressure in the first cavity when a pressure differential across the piston seal reaches a threshold. The step of redirecting fluid includes channeling fluid from the inlet through a housing of the actuator assembly.

The method of the preceding paragraph, further including the step of disengaging a downlock pin. The downlock pin is configured to limit movement of the actuator rod when a ram air turbine is in a deployed position.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuator assembly comprising:
a housing;
a piston;
an actuator rod connected to the piston;
a first internal cavity within the housing configured to partially contain a pressurized fluid on a first side of the piston;
a second internal cavity within the housing configured to partially contain the pressurized fluid on a second side of the piston;
a fluid inlet port connecting a first opening on an outer surface of the housing to the first internal cavity;
a fluid outlet port connecting a second opening on the outer surface of the housing to the second internal cavity;
a relief inlet adjacent to the fluid inlet port and in fluid communication with the first internal cavity;
a relief outlet, wherein the relief outlet is in fluid communication with the second internal cavity when the actuator rod is in a fully extended position; and
a pressure relief valve positioned between the relief inlet and the relief outlet and configured to direct fluid from the relief inlet to the relief outlet when the pressure relief valve is open.

2. The actuator assembly of claim 1, wherein the pressure relief valve is in direct fluid communication with the fluid inlet port.

3. The actuator assembly of claim 2, wherein the pressure relief valve is located within the housing.

4. The actuator assembly of claim 2, further comprising:
a relief channel, wherein the relief channel includes the relief outlet and wherein the pressure relief valve is positioned perpendicular to both the fluid inlet port and the relief channel and wherein the distance between the relief outlet and the fluid inlet port approximately matches a length of the pressure relief valve.

5. The actuator assembly of claim 2, wherein the pressure relief valve is configured to open when a pressure differential across the relief inlet and relief outlet reaches a threshold value not exceeding 100 psid (689 kPa).

6. The actuator assembly of claim 2, wherein the pressure relief channel extends fully through the housing and wherein a plug is positioned in the pressure relief channel at the outer surface of the housing.

7. The actuator assembly of claim 2, further comprising:
a first spring;
a second spring; and
a spring carrier located at an end of the actuator rod, wherein the first spring extends from a first portion of the piston to an end of the housing adjacent the fluid outlet port, and wherein the second spring extends from a second portion of the piston to the spring carrier.

8. The actuator assembly of claim 7, further comprising:
a ram air turbine;
a strut connecting the ram air turbine to the actuator rod;
a pivot post about which the strut is configured to rotate, the pivot post being fixed to a mounting location;
a collar fixed to the pivot post; and
a downlock pin, wherein the downlock pin engages the collar to limit rotational movement of the strut when the ram air turbine is in a deployed position, and wherein the location of the relief outlet corresponds to a position of the strut wherein the strut has rotated past a point where the downlock pin, if engaged, would prevent movement.

9. The actuator assembly of claim 7, wherein the piston further comprises:
a seal wherein the seal is positioned along a perimeter of the internal cavity between the fluid inlet port and the relief outlet when the actuator rod is in a fully deployed position and is positioned between the relief outlet and the fluid outlet port when the actuator rod is in a fully retracted position.

10. The actuator assembly of claim 9, wherein the seal is positioned along the perimeter of the internal cavity between the relief outlet and the fluid outlet port when the spring carrier contacts the end of the housing adjacent the fluid outlet port.

11. The actuator assembly of claim 9, wherein the location of the relief outlet corresponds to a position less than or equal to 20 percent of the piston stroke.

12. The actuator assembly of claim 1, wherein the relief outlet has a smooth circumferential edge.

13. An actuator assembly for a ram air turbine, the actuator assembly comprising:
a housing;
a piston;

an actuator rod connected to the piston;

a first and second internal cavity within the housing configured to partially contain a pressurized fluid on a first and a second side of the piston; and a pressure relief valve with a relief inlet and a relief outlet, wherein the relief inlet is in fluid communication with the first cavity and the relief outlet is in fluid communication with the second cavity when the actuator rod is in a fully extended position, and wherein each of the pressure relief valve, relief inlet, and relief outlet are located within the housing.

14. The actuator assembly of claim 13, wherein the pressure relief valve is activated by a pressure differential between the first and second cavity equal to or less than 100 psid (689 kPa).

15. The actuator assembly of claim 13, wherein the location of the relief outlet corresponds to a position less than 80 percent of the piston stroke.

16. The actuator assembly of claim 13, wherein the location of the relief outlet corresponds to a position less than or equal to 20 percent of the piston stroke.

17. The actuator assembly of claim 13, further comprising:

a strut connected to the actuator rod;

a pivot post about which the strut is configured to rotate, the pivot post being fixed to a portion of an aircraft;

a collar fixed to the pivot post; and a downlock pin, wherein the downlock pin engages the collar to limit rotational movement of the strut when the actuator rod is in a deployed position, and wherein the location of the relief outlet corresponds to a position of the strut wherein the strut has rotated past a point where the downlock pin, if engaged, would prevent movement.

18. The actuator assembly of claim 13, further comprising:

a fluid inlet in fluid communication with the first cavity and the relief inlet of the pressure relief valve, and wherein the pressure relief valve is positioned substantially perpendicular to the fluid inlet and wherein a distance between the relief outlet and the fluid inlet approximately matches a length of the pressure relief valve.

19. A method of operating an actuator assembly for stowing a ram air turbine, the method comprising the steps of:

pumping hydraulic fluid into an inlet in a first cavity of a hydraulic cylinder to retract an actuator rod from a fully deployed position; and redirecting fluid from the first cavity to a second cavity opposite a piston seal to relieve pressure in the first cavity when a pressure differential across the piston seal reaches a threshold, wherein the step of redirecting fluid comprises channeling fluid from the inlet through a housing of the actuator assembly and wherein redirecting fluid prevents retraction of the actuator rod.

20. The method of claim 19, further comprising the step of:

disengaging a downlock pin, the downlock pin being configured to limit movement of the actuator rod when a ram air turbine is in a deployed position.

* * * * *